July 14, 1964 A. W. VINAL 3,141,155
MAGNETIC MEMORY SYSTEM
Filed June 28, 1961 4 Sheets-Sheet 1

INVENTOR
ALBERT W. VINAL
BY Ralph R Barnard
ATTORNEY

July 14, 1964

A. W. VINAL 3,141,155

MAGNETIC MEMORY SYSTEM

Filed June 28, 1961

4 Sheets-Sheet 4

United States Patent Office 3,141,155

Patented July 14, 1964

3,141,155
MAGNETIC MEMORY SYSTEM

Albert W. Vinal, Owego, N.Y., assignor to International Business Machines Corporation, New York, N.Y., a corporation of New York Filed June 28, 1961, Ser. No. 120,308
3 Claims. (Cl. 340—174)

This invention relates generally to digital storage systems, and more particularly to means for writing binary serial digital information into a random access nondestructive memory.

There are many engineering compromises which have to be made in designing a digital data processing system. One decision that has to be made is the selection between the use of a serial technique or a parallel technique for the representation of the electrical digital information as it is handled. Generally speaking, the serial technique requires less equipment and components than a system utilizing the parallel technique. However, the system using the serial technique handles the electrical digital information at a slower speed. The decision to use the parallel or serial technique must be considered from the point of view of all the fundamental building blocks of the computer such as the memory, the arithmetic, the program control unit and the input and output units.

Certain practical applications of digital processing systems can tolerate a slower speed in data handling, yet the component count power consumption and weight are critical. In those instances, the serial technique is usually the type selected. As a specific example, the serial technique is generally desirable when the input and output common connection with the data processing system is by high frequency telemetering links since these systems inherently present the electrical data in serial form.

In serial machines, magnetic drums are often selected for the memory unit and registers. Magnetic drums are often considered undesirable for particular applications because of their kinematic properties and their power consumption. Alternatively, delay lines may be substituted for the magnetic drum. However, delay lines have the disadvantage of requiring a large volume and weight when the data bit storage requirement is large. In both the drum and the delay lines, time is one of the selected coordinates for access to the information stored therein. Stated another way, the electrical digital information is available only at selected times. Because of this time limitation, data processing systems utilizing a drum or a delay line as a storage means are difficult to program and relatively inefficient in their utilization of available storage capacity.

Another type of memory is available in the prior art known as the random access memory. One example of such a memory is the magnetic core array wherein individual elements are selected for writing and reading in accordance with X and Y coordinates. In such memories, time is not a selected coordinate and any individual element or group of elements storing a unit of digital information (such as a word or number) may be available at an access time required for the reading operation.

The magnetic memory element array using X and Y coordinate selections are of two general types. One type is characterized by the use of memory elements wherein the information is destroyed on reading the information from the element. This type is known as the destructive memory and a writing cycle must follow every reading cycle whenever it is desired to retain that information in memory.

Copending application, Serial No. 79,722, filed December 30, 1960, same inventor, and assigned to the same assignee as the present invention, discloses a technique for utilizing a magnetic random access nondestructive memory in a three dimensional X and Y coordinate addressing instrumentation in a manner so that a unit of electrical binary information (a word) may be read out from storage in serial form rather than in parallel. With a known technique for reading electrical binary information in serial form from a three dimensional random access memory, the communication with that type of memory is a serial data processing application still requiring a means of instrumenting a memory so that binary information in a parallel form could be written directly into memory.

The other type of random access memory is known as nondestructive. Therein, a reading operation within a selected element or plural elements does not destroy the stored condition; therefore, a writing cycle does not necessarily follow a reading cycle if it is desired to retain the information within the memory that has been previously read out.

While the magnetic random access memories have the advantage of easy and quick access to stored information, they have been considered in the prior art as of the type which could store only parallel digital information. This was primarily the result of the fact that the magnetic random access destructive memory type is in wide usage and the fact that the three dimensional X and Y coordinate addressing technique used in combination therewith precluded the reading information out of storage in any form except in parallel. Therefore, whenever a magnetic random access memory has been used in a serial digital processing machine, the digital information had to be converted from parallel to serial form (and vice versa) prior to storing in the memory. This required an increase in component count by reason of the inclusion of the equipment for this conversion.

In systems where it is desired to use the serial technique to reduce component count and therefore increase reliability, it becomes important that serial data processing circuitry be able to communicate directly with a random access memory without the need for extra converting equipment prior thereto.

It is, therefore, the primary object of the present invention to provide a new and improved means for writing serial digital information directly into a random access nondestructive memory.

It is still another object of the present invention to provide a new and improved means for writing serial digital information directly into a random access nondestructive memory utilizing a minimum of components for obtaining a high reliability.

It is still another object of the present invention to provide a new and improved magnetic memory system wherein a random access capability is combined with a capability for storing serial binary digital information directly into a random access nondestructive memory utilizing a minimum of components for obtaining a high reliability.

A further object of the present invention is to provide a new and improved magnetic memory system wherein a random access capability is combined with a capability for storing serial binary digital information without converting that information to parallel form prior to storage.

Another object of the present invention is to provide a new and improved three dimensional or word organized magnetic memory system wherein a random access capability is combined with a capability for storing serial binary digital information without converting that information to parallel form prior to storage.

Briefly, the objects of the invention are provided by constructing a memory of plural information elements capable of representing two stable conditions wherein X and Y coordinate addressing conductors are capable of repetitively selectively energizing one or more information elements and place them in one binary condition or the other. The one or more information elements make up a unit of binary digital information. Plural inhibit energizing conductor means are utilized with one of said inhibit energizing conductor means being associated with all of the memory elements capable of storing the corresponding bit in plural units or words of digital information. A separate inhibit driver having two input terminals is connected to selectively energize each inhibit conductor. One input of each of the inhibit drivers is commoned with the corresponding input of the other inhibit drivers so that each will receive serial binary digital information which it is desired to be written into memory. The other input of each inhibit driver is connected to receive conventional bit gate voltages from a source at a time associated with the bit time to which the associated inhibit conductor corresponds. The inhibit driver acts to energize its associated inhibit conductor in response to the presence of a voltage pulse in the instantaneous serial binary digital information except during that time when it is receiving an input from its associated bit gate source.

The foregoing and other objects, features and advantages of the invention will be apparent from the following more particular description of a preferred embodiment of the invention, as illustrated in the accompanying drawings.

While the teachings of the present invention can be utilized to instrument a magnetic random access memory of either the destructive or nondestructive type so that serial binary information can be stored directly therein, they are illustrated herein with respect to a nondestructive memory since such a memory also has the capability of a direct read out stored binary digital information in serial form. Reference is made to the copending application, Serial No. 79,722, further identified hereinabove.

Figure 3:
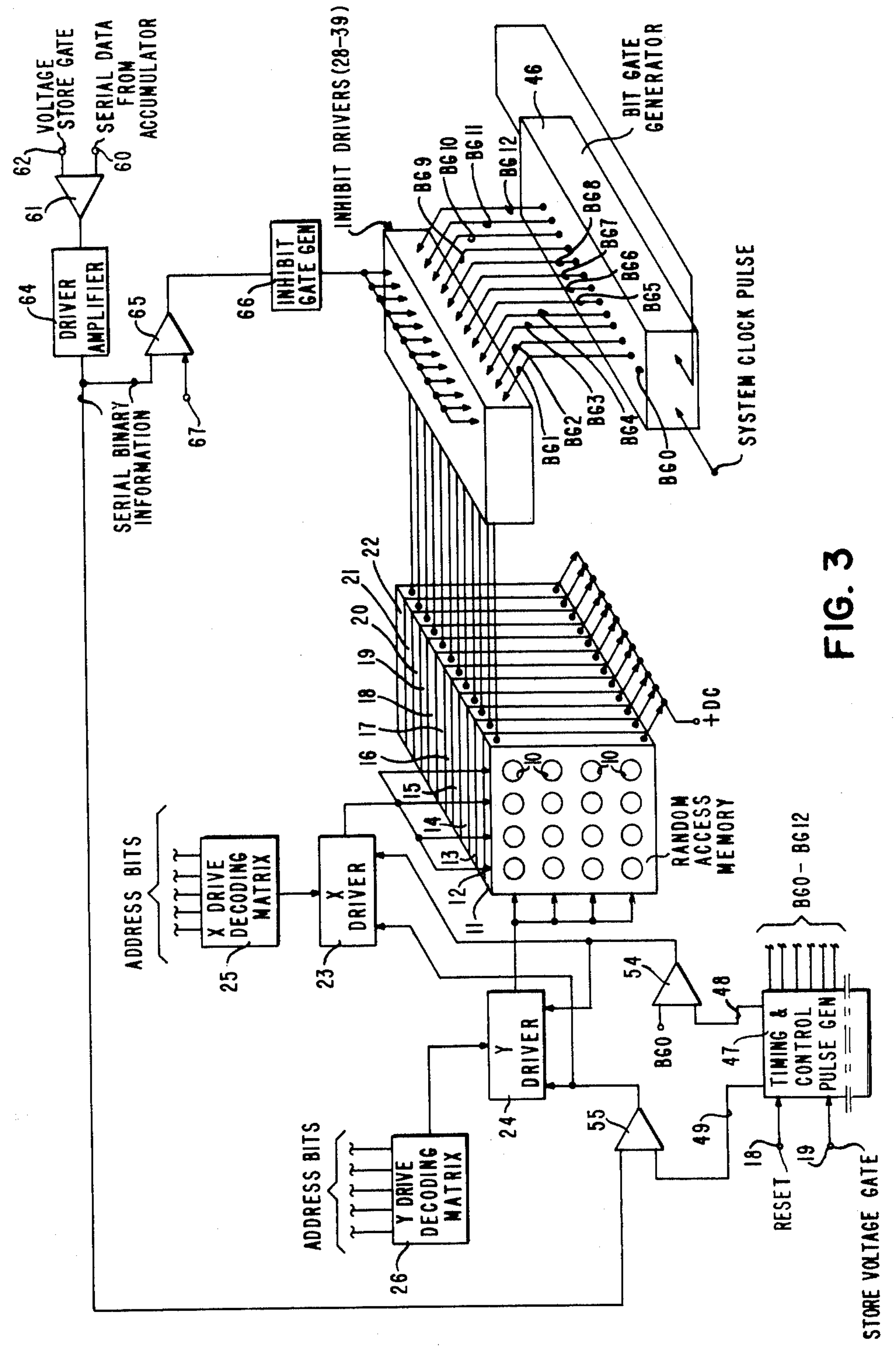
FIG. 3 shows a magnetic memory system wherein a three dimensional random access capability is combined with capability for storing serial binary digital information in accordance with the teachings of the present invention.

Referring again to FIGS. 1A and 1B, there is shown a nondestructive memory element which may be utilized in the memory system of the embodiment of the present invention as shown by FIG. 3. The memory element comprises a two-aperture device of the type described in more detail in copending application, Serial No. 823,525, "Magnetic Devices," filed June 29, 1959, and assigned to the same assignee as the present invention. FIG. 1A shows the two-aperture memory element in its blocked condition representing a binary zero. The aperture at the left functions as a read aperture and the aperture at the right functions as a control aperture. By means of the coincident application of a current pulse on each of coordinate control address conductors $X_C$ and $Y_C$, the magnetic material around the read aperture is placed in a blocked conditiond by deriving a magnetomotive force which orients the flux on both sides of the read aperture in the same direction as shown. Consequently, when coincident current pulses of normal operating amplitudes are applied to both the read current address conductor $X_R$ and the read address conductor $Y_R$, sufficient magnetomotive force will not be generated in the magnetic material adjacent the read aperture to reverse the flux around the aperture because the path length of which the magnetomotive force must be effective includes the path extending around the control aperture. Since no flux (or very little) is reversed around the read aperture, no voltage is induced in the sense winding shown and the two-apertured magnetic element is in the blocked or binary zero condition.

Figure 1B:
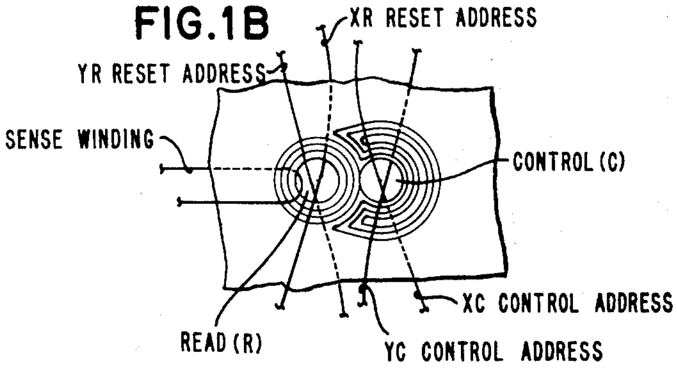
FIGS. 1A and 1B show an exemplary individual nondestructive memory element in the blocked and unblocked conditions, respectively. While the element in itself forms no part of the teachings in the present invention, an understanding of the nature of its nondestructive read operation is important in understanding the preferred embodiment of the teachings of the present invention.
Figure 1A:
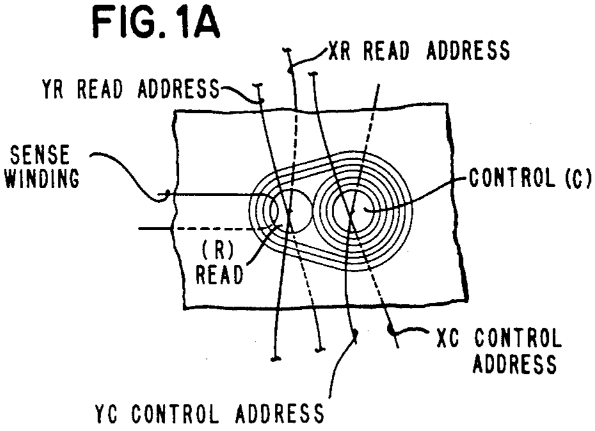

FIG. 1B shows the same apertured pair in the unblocked or binary one condition. In order to change the device of FIG. 1A to FIG. 1B, it was only necessary that coincident current pulses be applied to the coordinate address conductors $X_C$ and $Y_C$ of sufficient magnitude and proper polarity to reverse the flux in the magnetic material between the two apertures and form a flux pattern shown in FIG. 1B. Upon inspection of FIG. 1B, it will be noted that the magnetic flux adjacent the read aperture is now in reverse directions and the effective path length with respect to the read aperture is now along the inner wall thereof. Therefore, when coincident current pulses of normal operating amplitudes are applied to the read address conductor $X_R$ and the read address conductor $Y_R$, there will be sufficient magnetomotive force present to reverse the flux around the read aperture, induce a voltage in the sense winding thereby indicating that an unblocked condition or binary one is stored in the two-apertured memory element.

When it is desired to make a random access memory comprising elements operating in accordance with FIGS. 1A and 1B, the elements may be arranged in plural planes for X and Y coordinate addressing. FIG. 3 shows such an array. Sixteen memory elements 10, such as described in FIGS. 1A and 1B, are arranged in each of the plural planes 11–22. By way of example, if the 16 memory elements 10 of plane 11 represent the first bit of sixteen binary words, then the corresponding two-apertured memory elements in the adjacent planes represent the second through twelfth bits in each of the sixteen binary words. This three dimensional array of memory elements is merely exemplary of a magnetic memory system. It is, of course, expected that the number of bits in each plane will vary in each practical application according to the number of binary words to be stored. One of the essentials of a memory system is that the amount of addressing instrumentation be minimized. One of the ways of economizing is to pass the same X and Y coordinate addressing conductors through the corresponding read or control apertures of all the elements with a corresponding X and Y position in all the planes representing the bits of a unit of binary digital information. Thus, all the bits of a unit of binary digital information, such as a word, are addressed simultaneously by the same X and Y address conductors during both the read and control operations.

Because all the bits of a binary word are coincidentally addressed substantially simultaneously, random access memory designers have assumed that it was necessary to write binary information in the memory in parallel. When an instrumentation became known for reading out of a random access memory directly in serial form, it became more important to be able to write into that type of memory directly in serial form. It is the fundamental teachings of the present invention that means are provided to write binary digital information into storage without resorting to the usual parallel writing operation. In order to not unnecessarily complicate the description of the present invention, there is no showing in FIG. 2 of a detailed manner in which the X and Y coordinate address conductors are passed through the elements 10 in the plural planes so that all the bits of a binary word are selected simultaneously. However, reference may be made to copending applications, Serial No. 79,722, filed December 30, 1960, and Serial No. 91,961, filed February 27, 1961, of the same inventor and assigned to the same assignee for the detailed techniques.

In addition, X and Y current drivers 23 and 24, respectively, are only shown symbolically connected to the address conductors. The details of exemplary X and Y coordinate current drivers to be used for selectively applying the necessary coordinate read and control current pulses may be found in Patent No. 2,988,732, issued June 13, 1961. The particular X and Y address coordinate conductors to be energized are determined by the addressing information which is applied to the X and Y addressing decoding matrices 25 and 26, respectively. The details of such a decoding matrix are conventional. The decoding matrices 25 and 26 interact with the X and Y address drivers 23 and 24 in the manner shown in the above-referred to Patent No. 2,988,732.

Figure 2:
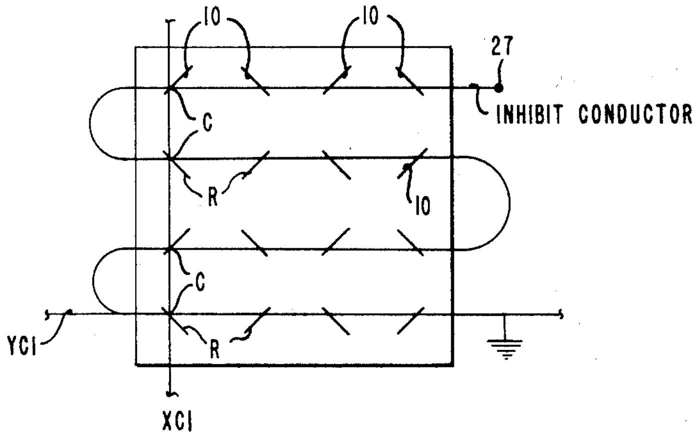
FIG. 2 shows an arrangement of plural nondestructive memory elements such as those in FIG. 1 arranged in a single plane for coordinate selection. The nature of inhibit windings connecting all the elements in a single plane is also shown.

In addition to the need for selecting address conductors passing through the appropriate aperture of each element located at the corresponding coordinates of each plane during the read or control operation, it is also necessary that each plane have both a sensing and inhibit conductor passing through the appropriate read or control aperture of all the elements in each plane. FIG. 2 shows a single plane wherein sixteen two-aperture elements 10 are arranged in an exemplary manner. The read aperture and control aperture of each element are labeled R and C, respectively. Moreover, the X and Y address windings $X_{C1}$ and $Y_{C1}$ are shown passing through the control apertures associated with the X1 and Y1 coordinates. As shown, the inhibit winding 27 passes through each of the control apertures of all of the memory elements 10 before being grounded. The sense winding corresponding to the plane of memory elements shown has not been included inasmuch as the reading operation is not important in the description of the present invention. Copending application, Serial No. 79,722, identified hereinabove shows how the sense winding may be connected with all the elements 10 of the plane. To briefly describe how the inhibit winding may be utilized, assume that the address conductors corresponding to the control aperture designated $X_{C1}$ and $Y_{C1}$ are coincidentally energized so that a control operation will be performed on the elements located at that coordinate. However, assume that the element at that location in the plane shown was already in the desired condition in order that the condition of the element in the plane shown not be modified as to the stored condition, a simultaneous current pulse may be applied to inhibit winding 27 to provide a magnetomotive force approximately equal to the magnetomotive force being provided by either addressing conductor $Y_{C1}$ or $X_{C1}$. It should be understood that the arrangement of the elements 10 in FIG. 2 coupled with the wiring arrangement of the inhibit 27 is illustrative of the cooperation of the elements and inhibit winding in each of the planes 11–22 of FIG. 3.

Figure 5:
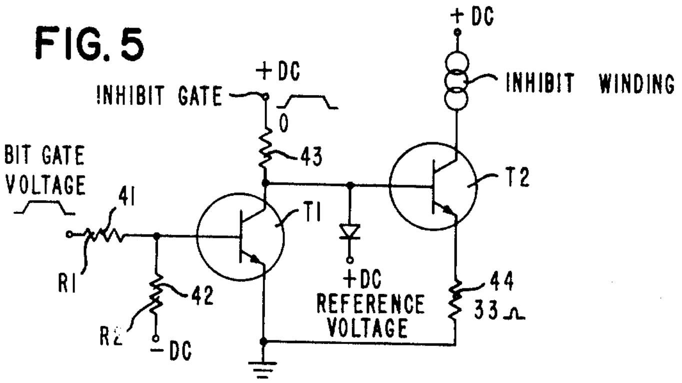
FIG. 5 shows an inhibt driver which is useful in instrumenting the systems shown in FIG. 3.

Referring again to FIG. 3, inhibit winding of each of the planes 11–22 has an inhibit driver associated therewith. These inhibit drivers are identified as inhibit drivers 28–39. Inhibit driver 28 selectively energizes the inhibit winding associated with plane 11 and so on. The circuit details of each of the inhibit drivers are the same. FIG. 5 shows a conventional design which may be utilized for each of the inhibit drivers 28–39. Briefly, FIG. 5 shows a first input terminal which may be connected to the appropriate bit gate generator 46 (BG1–BG12). This input terminal is connected to the base of a transistor T1 electrically arranged in a common emitter configuration through resistor 41. The emitter of transistor T1 is grounded and the base of transistor T1 is biased by a D.C. source through resistor 42 so that in the absence of a positive voltage level from the bit gate input terminal, the base emitter junction of transistor T1 is backbiased and T1 is in a nonconducting condition. The collector of transistor T1 is connected to another input terminal through resistor 43. This latter input terminal is connected to an inhibit gate to be energized in accordance with the output of an inhibit gate generator. The collector of T1 is connected to the base of a second transistor T2 also connected in a common emitter configuration. Connected between the emitter of the transistor T2 and ground is an emitter feedback resistor 44. Connected to the base of T2 is a clamping diode D1 with its other extremity connected to a +D.C. clamping voltage. The inhibit winding is used to connect a +D.C. source to the collector so as to reverse bias the base collector junction.

Accordingly, if a positive going voltage source is applied to the inhibit gate when a positive going pulse is being applied by the appropriate bit gate generator at the other input terminal, transistor T1 will be in conduction and its colector will not rise to follow the voltage level of the positive going pulse being applied by the inhibit gate. On the other hand, as transistor T1 is not placed in a conduction condition by the input connected to the bit gate generator, the positive going pulse being applied to the other input by the inhibit gate generator will be applied to the base of transistor T2 thereby placing it in conduction so as to energize the inhibit winding. The clamping diode will clamp the base at the reference voltage level so that the magnitude of the current pulse applied to the inhibit winding may be closely controlled.

The bit gate generator 46 which provides bit gates BG0–BG12 typically common to a serial data processing system may be of conventional construction.

According to the teachings of the present invention, when it is desired to write or store in a memory location a binary digital word which is present in the data processing system in serial form, aforementioned the bit gate generator, the inhibit drivers, the inhibit winding and the X and Y addressing for the location in which it is desired to store the information may be utilized simultaneously to obtain that result. Briefly, all of the memory elements at the word location in which it is desired to store the serial information is first controlled to store a reference condition such as a binary zero. Thereupon, a writing operation is repeated for each plane (and bit of the word) with the cooperation of the inhibit drivers so that the serial word is stored bit by bit in the word location. Specifically, a timing and control pulse generator 47 is used to energize X and Y control address conductors at the word location at which the word is to be stored by the application of successive control pulses, exceeding by one the number of bits in the serial digital information to be stored. The initial extra pulse is of one polarity and the remaining timing and control pulses are of the other polarity. According to the exemplary embodiment shown in FIG. 3, this would require thirteen pulses. By way of example, it may be assumed that the polarity of the first pulse is selected so that the timing and control pulse generator will appropriately energize the X and Y address driver so that all the memory elements 10 at the selected word location will first be placed in a binary zero condition. Since the first timing and control pulse is of the polarity to place all of the elements 10 in the binary zero condition, the next twelve timing control pulses will be of a polarity to write (or control) a binary one in all of the elements 10 at the selected word location. The inhibit winding associated with each of the separate bits of the selected binary word may then be utilized in cooperation with the timing and control pulse and the serial binary digital information to be stored to assure that a binary one condition is written into the corresponding bit locations where appropriate.

Figure 6:
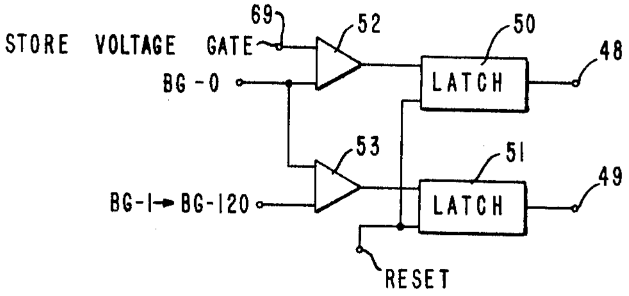
FIG. 6 shows a timing and control pulse generator of conventional design which is useful in instrumenting the systems shown in FIG. 3.

The details of the timing and control pulse generator are shown in FIG. 6. Therein, the timing and control pulse generator is shown to have two outputs. One for providing a negative voltage pulse output terminal 48 corresponding to the extra pulse for placing all the elements in the selected word in the binary zero condition and the other output terminal 49 for providing the series of voltage pulses of the positive going polarity corresponding in number to the number of bits in the serial binary information to be stored (herein shown as 12). Latch 50 is utilized to shape the voltage pulse being applied to output terminal 48 while latch 51 is utilized to shape the voltage pulses appearing at output terminal 49. By way of example, latch 50 is constructed so that it will provide a negative going voltage pulse whereas latch 51 will provide a positive going voltage pulse. Once a storage mode voltage gate is present and provides an up voltage level to conventional AND circuit 52 and conventional AND circuit 53, the timing and control pulse generator 47 is ready to generate the output voltage pulses as heretofore described. These output voltages are shown as the waveform N of FIG. 4.

Figure 4:
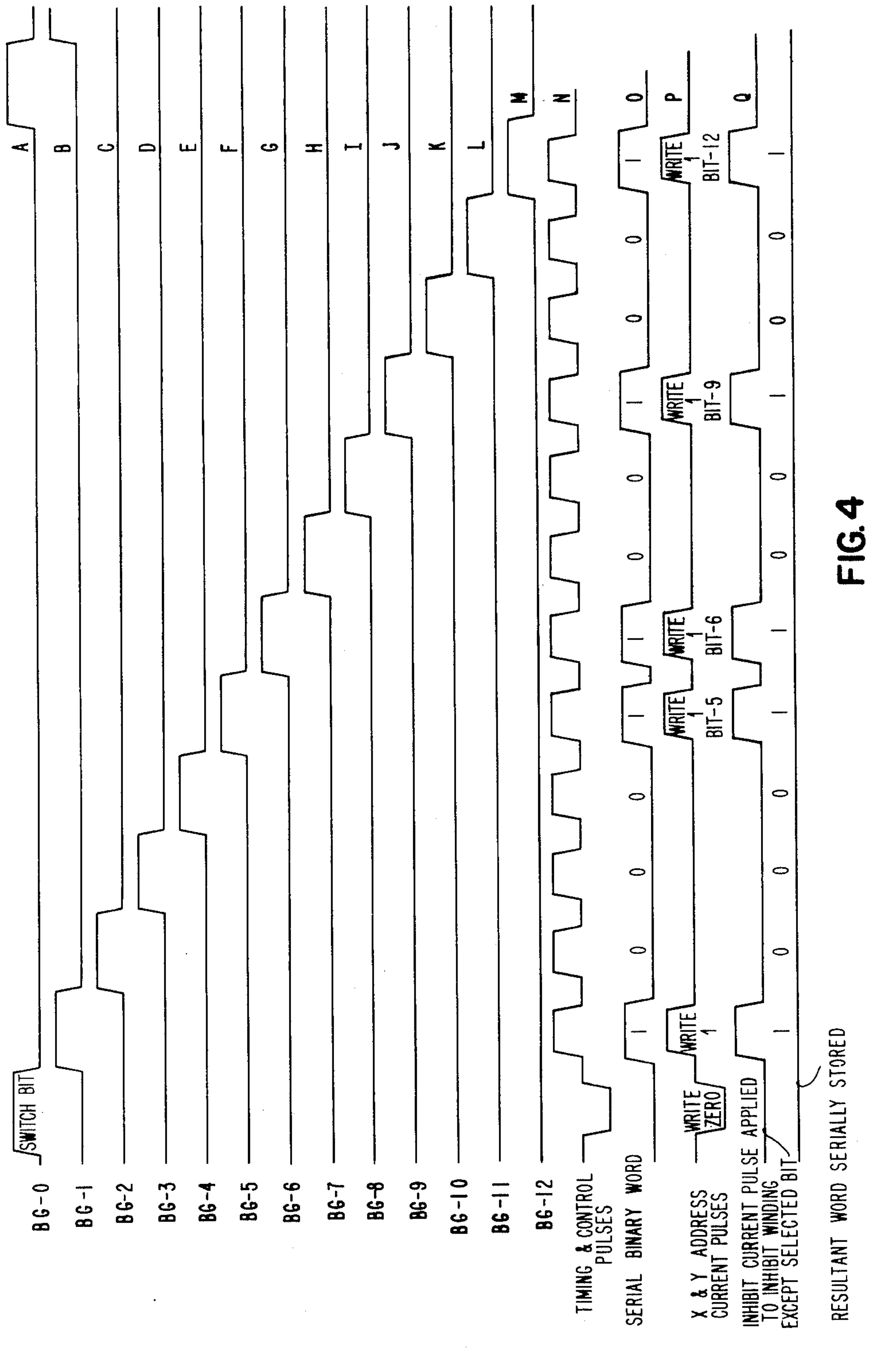
FIG. 4 shows a timing diagram of voltage waveforms which is useful in understanding the operation of the system of FIG. 3.

In FIG. 4, bit gate voltages BG0 and BG12 are shown in waveforms A–M with time increasing along the abscissa to the right. Directly beneath the bit gate voltage pulse waveforms is the waveform N of the output from the timing and control pulse generator 47. The first voltage pulse on that waveform illustrates the referencing voltage pulse being provided at output terminal 48 for the purpose of placing all the bit locations of the address binary word in an initial binary zero condition. Specifically, bit gate voltage BG0 is applied to AND circuit 52 at an appropriate point of time and latch 50 goes to its set condition and output terminal 48 goes to a down level corresponding to the desired polarity of the referencing voltage plane. Bit gate voltage pulse BG0 is effective to pass this reference voltage pulse through AND circuits 54 to the X and Y coordinate current drivers 23 and 24, respectively. Depending upon the condition of decoding matrices 25 and 26, a particular word location is selected and appropriate X and Y address conductors place all of the elements at the selected word location in a reference condition represented by binary zero and the flux pattern shown in FIG. 1A. None of the inhibit drivers 28–39 were energized inasmuch as there was no voltage pulse present on the data input line represented by the waveform shown adjacent the timing and control pulse generator waveform. The voltage waveform P labeled X and Y current address pulses indicates that the current pulse applied to all the elements of the selected binary word had a polarity as shown which would place all of these elements in a binary zero condition.

During the time corresponding to the up voltage BG1, the timing and control pulse generator provides a voltage pulse at output terminal 49 like that shown in the voltage waveform N. Referring to FIG. 6, voltage pulse BG1 in the presence of a storage voltage gate is effective to cause AND circuit 53 to set latch 51 so that the positive going voltage pulse is generated at output terminal 49. Following each bit gate, a timing pulse resets either latches 50 or 51 depending upon their condition. During bit gate time BG1, the voltage pulse appearing at terminal 49 provides one input to AND circuit 55. The other input of AND circuit 55 is connected to receive a voltage pulse as shown in waveform O in FIG. 4 commensurate with the data word to be serially written into the memory. During BG1 time, and assuming a data word of twelve bits as shown in FIG. 4, the data word is represented as a binary one by the positive voltage pulse shown. Since AND circuit 55 is receiving two up voltage levels, X and Y drivers 23 and 24 generate the current pulse shown in waveform P in appropriate X and Y address conductors. As a result of these in coincident current pulses, all the memory elements in the selected X-Y word location would normally be driven to a binary one condition represented by FIG. 1A. However, because the inhibit drivers 28–39 and the inhibit winding associated with memory planes 11–22 are simultaneously energized, only the memory element of the selected word in plane 11 will be placed in the binary one condition. The other memory elements in the selected word remain in the reference binary zero condition. Waveform Q corresponding to the inhibit current pulse is shown in FIG. 4. This current pulse is applied to all the inhibit windings except that associated with plane 11 because the voltage pulse corresponding to BG1 was effective to render inhibit driver 28 nonresponsive to the first bit of the serial digital binary word to be stored. The resultant binary condition stored in the selected word location in plane 11 is indicated in FIG. 4.

During BG2 time, a voltage pulse like that shown in the timing and control pulse generator waveform N is derived at output terminal 49. Since the binary information corresponding to BG2 time is zero (see waveform O), AND circuit 55 provides no output to X and Y drivers 23 and 24. AND circuit 65 provides no output to the inhibit gate generators 28–39. The stored conditions of the memory elements representing the selected binary word remain as before and without the expenditure of power. The memory element in plane 11, representing the selected bit, is in a binary zero condition as shown in FIG. 4. During BG3 and BG4 times, the operation of the memory is exactly the same as during BG2 time and the selected memory elements 10 in planes 12 and 13 remain in a binary zero condition as shown in FIG. 4.

However, during BG5 time, the serial binary digital information contains a positive voltage pulse indicative of a binary one condition. Therefore, when a voltage pulse like that shown in the timing and control pulse generator waveform N and appearing at output terminal 49 during BG5 time is applied to AND circuit 55 along with the voltage pulse indicating a binary one, the X and Y drivers 23 and 24 are energized with a current pulse like that shown in waveform P of FIG. 4 so that all of the elements in a selected word receive coincident energizing sufficient in amount to drive them to a binary one condition. The voltage pulse indicating a binary one is also applied to AND circuit 65 so as to cause inhibit gate generator 66 to generate a voltage pulse in one input of each of the inhibit drivers 28–39. All of the inhibit drivers, except inhibit driver 32, corresponding to plane 15 are driven into a conducting condition so that an inhibit current is produced in the inhibit winding 15 connected thereto. Ths inhibit current opposes the coincident energization from the selected X and Y address conductors so that the only element affected by the coincident current address energization is the selected memory element 10 in plane 15. That element is driven into a binary one condition as shown in FIG. 4. Inhibit driver 32 is not driven in conduction by the positive voltage pulse of the data word applied to one of its inputs because the voltage BG5 from the bit gate generator maintains the driver in a nonconducting condition.

During bit gate time BG6, the data word also contains a positive voltage pulse (waveform O) representing the binary one and there is the same functional relationship between the serial binary data word input and the output of the timing control pulse generator as during bit gate time BG5. Moreover, an input voltage pulse from the data word causes all the inhibit drivers and inhibit windings except that associated with plane 16 to be energized. As before, a binary one condition is written into the memory element corresponding to the selected word location within plane 16.

During bit gate times BG7 through BG12, similar operations take place and the serial binary information is written bit-by-bit in the repetitively coincidentally address binary word location. During BG7 time, a binary zero condition is written into the selected element 10 in plane 17; during BG8 time, a binary zero condition is written into the selected element 10 in plane 18; during BG9 time, the binary one condition is written into the selected element 10 in plane 19; during BG10 time, the binary zero condition is written into the selected element 10 in plane 20; during BG11 time, the binary zero condition is written into the selected element 10 in plane 21; and during BG12 time, the binary one condition is written into the selected element 10 in plane 22.

As shown, the serial binary digital information to be written into memory is applied to the writing circuitry through terminal 60. In many data processing applications, the source of this serial binary information will typically be the accumulator in the arithmetic unit. However, this may vary with the practical application.

From input terminal 60, this serial information may, by way of example, be passed through an AND circuit 61 where it is timed and shaped by another input voltage pulse known as a strobe voltage gate, or store voltage gate, being applied to a terminal 62. The output of AND circuit 61 may be then applied through a conventional driver amplifier 64. The output of the driver amplifier is then, according to the teachings of the present invention, applied on the one hand to one input of AND circuit 55 and on the other hand to the commoned input of the inhibit drivers 28 through 39 through AND circuit 65 and inhibit gate generator 66. Inhibit gate generator 66 may be of conventional construction, for example, it may comprise a conventional latch with a reset input. AND circuit 65 is included for purposes of providing proper timing. One of the input terminals 67 of AND circuit 65 provides a timing input.

While the detailed description of FIG. 3 describes the X and Y coordinate addressing in terms of a coincident current three dimensional approach, it should be clear that the teachings of the present invention with respect to writing serial binary information directly into a random access memory may also be applied to a word organized memory. More specifically, in a word organized memory, an end on switch with X and Y coordinate selection means may be utilized to energize a single conductor passing through all of the control apertures in the plural planes at a particular X-Y coordinate. In this way, all of the elements 10 storing all of the bits of a binary word could be selectively energized with a current pulse of sufficient magnitude and polarity to change the stored condition of each memory element. The theory of the present invention would remain the same, the only difference would be in the manner (one address conductor, then two coordinate address conductors) in which a magnetomotive force is applied to the magnetic material around the aperture of each of the elements in the plural planes at a given X-Y location. The interaction of the inhibit winding energization with the address conductor energization to provide a serial binary write operation would be the same.

While the present invention has been described in terms of using nondestructive memory elements 10, it should be clear that the same technique could be utilized if memory elements 10 were of the single path toroidal core type. The writing operation would be the same.

The latches, AND circuits, diode matrices and current driver amplifiers shown in the disclosed embodiment are of a conventional construction. Moreover, many circuit blocks in inputs which would be necessary for a particular practical application to provide both timing and pulse amplitude have not been shown in the interest of clarifying description. The means for obtaining proper timing and pulse amplitudes are well within the skill of those working in the field.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. An electrical digital memory system comprising: plural planes of plural magnetic memory elements, each of said elements in a corresponding location of each of said planes being energizable to change the magnetic condition thereof representative of a binary state; repetitive X and Y coordinate coincident energizing means associated with each memory element for selectively engaging corresponding elements in each of said plural planes so as to a store a unit of binary digital information at the respective locations; separate inhibit energizing means cooperatively associated with all memory elements of each plane; a source of serial binary information to be stored; said repetitive X-Y coordinate energizing means and said plural inhibit energizing means operatively related and responsive to input of said serial binary information so that said serial binary information is stored in selected memory elements bit by bit; said repetitive X-Y coordinate energizing means for selecting plural memory elements comprising a pulse source for providing a sequential set of address control pulses having a number exceeding the number of bits in a unit of binary digital information by one with a first occurring extra voltage pulse being of one polarity and the remaining voltage pulses being of the other polarity; X-Y coordinate driver means, said control pulses being passed to X-Y coordinate driver means via AND gating circuitry in parallel with the serial binary information signals to be stored: said separate inhibit energizing means including a separate inhibit winding for each plane cooperatively associated with each element thereof, an inhibit driver having at least two inputs connected to each inhibit winding, one input of each inhibit driver being commoned for connection to said source of serial binary information to be stored; a bit gate timing source connected to the other input of each inhibit driver such that when said inhibit driver receives a bit gate signal at a time corresponding to the bit time of the information to be stored in the associated element said inhibit driver is conditioned to be nonresponsive to said serial binary information source.

2. An electrical digital memory system for storing binary digital information comprising: a plurality of information storage elements having two distinctive settable stable states, plural of said information elements each representing a bit of a unit of binary digital information; means for selectively energizing all of said plural memory elements so as to set up therein one binary stable state or the other; a separate inhibit energizing means associated with each element of the plural elements representing a given unit of binary digital information; a separate inhibit driver connected to each inhibit energizing means; a generator for generatng bit gate voltages associated in time to correspond with the bit timing of serial binary digital information to be written into the memory; a timing and control pulse generator for generating a series of pulses exceeding by one the number of bits in the serial binary information to be stored, said initial extra pulse being of a first polarity, the remaining timing pulses being of the other polarity; said inhibit drivers responsive to a common input of said serial binary information to be stored and of bit gate voltages from said bit gate generator for selectively energizing the associated inhibit energizing means in cooperative action with said means for selectively energizing all of said plural memory elements so that serial binary digital information is stored in selected elements associated with non-energized inhibit energizing means.

3. A magnetic core memory system for storing electric signal information available in serial form, comprising:

a plurality of non-destructive magnetic memory elements arranged in a plurality of individual planes, each plane having equal numbers of elements arranged in similar geometry;

paired energizing conductors associated with each memory element, which conductors on being provided with simultaneous energization set the associated element to a first magnetic state;

a separate inhibit conductor provided for each plane and operatively related to each of the elements of the associated plane;

separate and individual addressing matrices and drivers for the paired energizing conductors;

timing and control means for providing a sequential set of control pulses including a first pulse of a first polarity and succeeding pulses of the set having the other polarity and a relative time spacing and magnitude for providing full coincidence with the serial electric signal information;

first gating means associated with said timing and control means and drivers for timing the setting of each of the elements called for by the address matrix to a first binary state and by succeeding control pulses to the respective binary condition corresponding to the serial binary information to be stored;

an inhibit gate generator and inhibit driving means;

second gating means electrically imposed between the serial binary information to be stored and inhibit gate generator, said second gating means being periodically enabled at select times relative to the presence of serial binary information;

means for controlling the inhibit drivers to provide control current to the inhibit conductors of elements other than those where storing is being effected and at times of storage;

said serial information to be stored being provided in groups consisting of a fixed number of individual electric signals identical to the number of memory planes, each of which signals can be stored in a single element; and said addressing matrices and drivers being so related to the memory elements of the different planes that selection and energizing of the paired conductors for a given element of a given plane simultaneously selects and energizes the paired conductors for the similarly located elements of each of the other memory planes and storage is prevented in other than the desired location by inhibiting the other planes whereby individual electric signals comprising a group are stored in different memory planes and at the same relative location within each plane.

References Cited in the file of this patent

UNITED STATES PATENTS

| | | |
|---|---|---|
| 2,740,949 | Counihan | Apr. 3, 1956 |
| 3,008,129 | Katz | Nov. 7, 1961 |
| 3,058,096 | Humphrey | Oct. 9, 1962 |
| 3,059,224 | Post | Oct. 16, 1962 |